United States Patent [19]
Suzuki et al.

[11] Patent Number: 5,204,181
[45] Date of Patent: Apr. 20, 1993

[54] HEAT-SEALED CLOSURE FOR POLYESTER CONTAINER AND CONTAINER HAVING SAID CLOSURE

[75] Inventors: Kouji Suzuki, Yokohama; Tsuneo Imatani; Hideo Kurashima, both of Yokosuka; Kazuo Taira, Tokyo, all of Japan

[73] Assignee: Toyo Seikan Kaisha, Ltd., Tokyo, Japan

[21] Appl. No.: 476,497

[22] Filed: Jun. 12, 1990

[30] Foreign Application Priority Data

Oct. 12, 1988 [JP] Japan .................................. 63-132333
Mar. 17, 1989 [JP] Japan .................................... 1-63815

[51] Int. Cl.⁵ .......................... B32B 7/12; B32B 15/04
[52] U.S. Cl. ..................................... 428/349; 428/344; 428/353; 428/355; 428/416
[58] Field of Search ................. 428/349, 353, 344, 355

[56] References Cited

U.S. PATENT DOCUMENTS 4,310,578 1/1982 Katsura et al. .................. 428/349 X
4,765,999 8/1988 Winer ............................... 428/349 X
4,921,764 5/1990 Rudd et al. ....................... 428/349 X
4,946,743 8/1990 Winter ................................ 428/349

FOREIGN PATENT DOCUMENTS 44-34180 5/1969 Japan .
58-41368 9/1981 Japan .
62-7480 8/1982 Japan .
62-53817 2/1985 Japan .
62-28764 2/1987 Japan .
62-10188 3/1987 Japan .

Primary Examiner—George F. Lesmes
Assistant Examiner—D. R. Zirker
Attorney, Agent, or Firm—Sughrue, Mion, Zinn, Macpeak & Seas

[57] ABSTRACT

The present invention provides a strong heat seal to a thermoplastic polyester container which can withstand hot water treatment such as retorting, and to a heat sealed container. A heat-sealable closure is also provided. It is composed of a laminate consisting of a heat-seal layer comprising as a main component a copolymerized polyester resin having a softening temperature of 120° C. and a glass-transition temperature of 30° to 85° C., a metal substrate, and an epoxy-phenol resin primer layer interposed between them.

Preferably, the container has a heat seal portion composed of a thermoplastic polyester having a fusion temperature in the crystalline state of at least 200° C. This polyester portion is oriented and crystallized or heat-crystallized.

10 Claims, 4 Drawing Sheets

FIG. 1-A
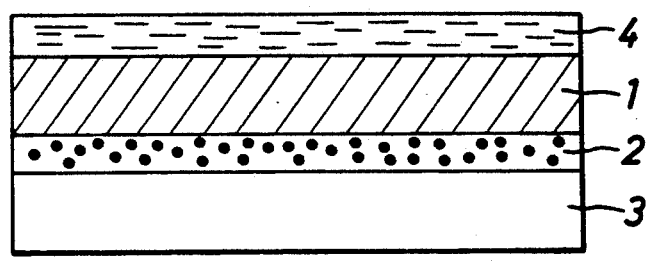
FIG. 1-B
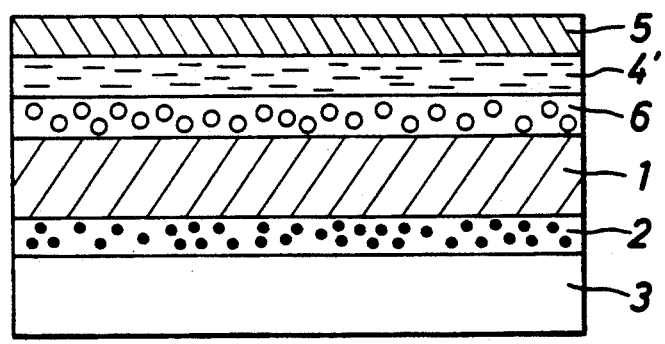

FIG. 2-A
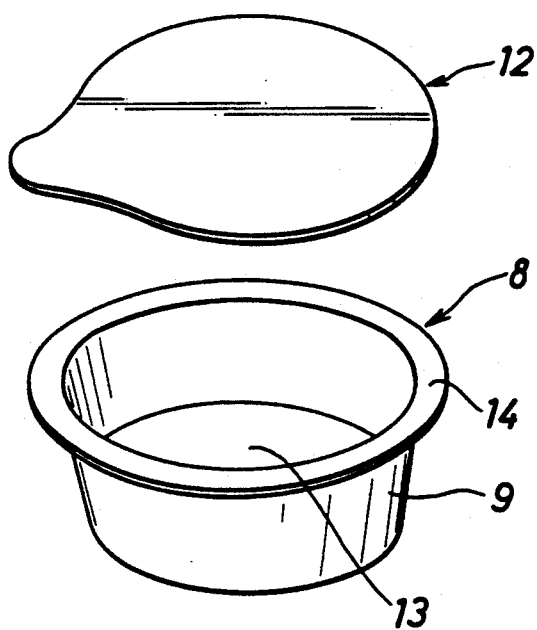
FIG. 2-B
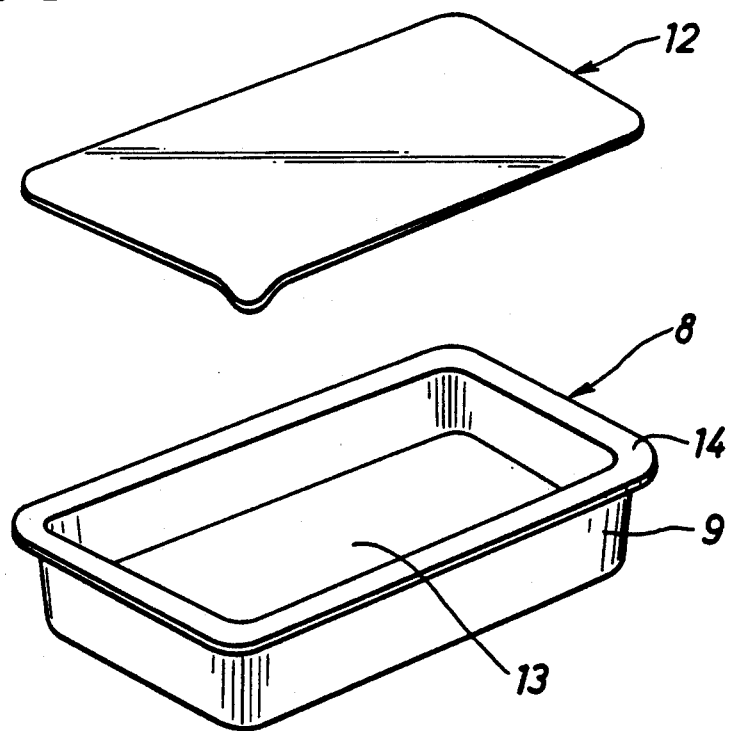

HEAT-SEALED CLOSURE FOR POLYESTER CONTAINER AND CONTAINER HAVING SAID CLOSURE

TECHNOLOGICAL FIELD

This invention relates to a heat-sealed closure for a polyester container, and more specifically to a closure which can be withstand retorting and be heat-sealed with excellent peel strength to a container at least a heat-seal portion of which is compound of a resin consisting mainly of polyethylene terephthalate.

This invention also relates to the aforesaid heat-sealed closure and a thermoplastic polyester container, and more specifically, to a container equipped with a heat-sealed closure having a combination of thermal resistance and low-temperature heat sealability.

DESCRIPTION OF THE PRIOR ART

Thermoplastic polyesters such as polyethylene terephthalate (PET) are excellent materials for containers holding foods because they have excellent mechanical strength, creep resistance, impact strength and transparency, little extractability by contents and good flavor retention of contents. Bottles obtained by blow-molding of these materials or containers composed of laminates of these materials are used practically as food packaging containers.

Previously, capping for bottles and double seaming of PET cans have already been used for tight sealing of PET containers. Attempts have also been made to seal PET cans with heat-sealed closures.

However, sealing by heat sealing of PET containers is extremely difficult in comparison with other plastic containers. PET has a very high melting point of 260° C., and its crystallization takes place mainly at a temperature of 100° to 240° C. Accordingly, the heat-sealing operation of PET itself is difficult. Even if it is forcibly heat-sealed, the crystallization makes the interface brittle, and only a low seal strength can be obtained.

For this reason, an outside layer container in which the outside surface is composed of crystallized PET and the inside surface is composed of isophthalic acid-modified copolymerized PET is used as a container, and a heat-sealable closure having a heat-sealable layer of copolymerized polyester inwardly of a metal foil are used, and a sealed container is prepared by performing heat sealing between the two copolymerized PET layers.

However, in the above-described heat-sealed closure, the adhesion strength between the metal foil and the copolymerized polyester layer is not sufficient. When it undergoes hot water treatment, delamination occurs readily between the metal foil and the copolymerized polyester layer.

Japanese Patent Publication No. 34180/1974 proposes a method of bonding in which in the bonding of a heat-sealable closure to a polyester container, a crystallizable saturated polyester is disposed between the adhrends, and melted by heating it to a temperature above its melting point, or a crystallizable saturated polyester is heated to a temperature above its melting point to melt it and disposed between the adhrends, and thereafter, quenching the crystallizable saturated polyester with a coolant to pass it rapidly between 220° to 67° C. Japanese Laid-Open Patent Publication No. 53817/1987 proposes a method of producing a container having a heat-sealed portion, which comprises heating several portions of a container-forming material in which at least an interface to be sealed is formed of a thermoplastic polyester so that the sealing interfaces of said portions and their vicinities will attain the heat-melting temperature by internal heat build-up and simultaneously press-bonding them, while the outside surfaces of said portions are maintained at a temperature lower than the crystallization temperature of the polyester, and passing the temperature of the sealing interfaces through a crystallization temperature region by radiation within 1.0 second after melting.

The proposal in the prior art are certainly satisfactory for the purpose of inhibiting crystallization of the PET layer at the time of heat sealing and thereby increasing the strength of the heat sealing portion, but are still unsatisfactory in that the temperature of the polyester heat seal interface is required to be raised to more than the melting point of PET.

Particularly, it is known that PET is markedly improved in the aforesaid properties by orientation and crystallization and its barrier property with regard to various components and its thermal resistance are elevated, and that heat crystallization of PET markedly enhances its thermal resistance or rigidity. However, PET which is so oriented and crystallized or heat-crystallized has a very high heat sealing temperature, and may cause thermal decomposition or thermal deformation of the container material. Another problem is that the heat-sealed portion is difficult to cool. Hence, commercial heat sealing on PET is extremely difficult.

Such problems are likewise recognized not only in PET but also in an inside surface material of a thermoplastic resin having a high melting point which is crystallized by molecular orientation or heat-crystallized.

ESSENCE OF THE INVENTION

It is an object of this invention to provide a heat-sealable closure for a PET container which can be heat sealed to a PET container with a strong sealing and which can withstand a hot water treatment such as retorting.

Another object of this invention is to provide a heat sealed container having low-temperature heat-sealability using the aforesaid heat-sealable closure.

Still another object of this invention is to provide a heat-sealed closure-equipped container in which a stable sealed portion having a high strength can be formed by low-temperature sealing within a short period of time, and in which this sealed portion can withstand high-temperature sterilization such as retorting.

A further object of this invention is to provide a heat-sealed closure-equipped container which has excellent thermal resistance and in which when goods contained are retorted or cooked in an electric oven or an oven toaster, the extraction of the inside material into the contents is markedly inhibited.

There is provided a heat-sealable closure for heat-sealing a container at least a portion to be heat-sealed of which is formed of a resin containing a thermoplastic polyester as a main component, said heat-sealable closure being composed of a laminate having a heat-sealable layer having as a main component a copolymerized polyester resin having a softening temperature of at least 120° C. and a glass transition temperature of 30° to 85° C., a metal substrate, and an epoxy-phenol resin primer layer interposed between them.

According to this invention, there is provided a heat-sealed packing container having low-temperature heat-sealability which is obtained by heat-sealing a container and a closure each composed of a resin comprising a polyester as a main component, said closure being composed of a laminate consisting of a heat-sealable layer comprising as a main component a copolymerized polyester resin having a softening point of at least 120° C. and a glass transition temperature of 30° to 85° C., a metal substrate and an epoxy-phenol resin primer layer interposed between them, said container having an inside layer composed of a thermoplastic polyester having a melting temperature of at least 200° C. in the crystallized state and being oriented and crystallized or heat-crystallized, the heat sealed portion in said inside layer having a thermoplastic polyester portion which is substantially rendered amorphous or low crystalline in a minute thickness from the heat-seal surface to halfways in the thickness direction of the inside layer.

BRIEF DESCRIPTION OF THE DRAWINGS

FIGS. 1-A and 1-B are sectional views of the laminate which constitutes the closure of this invention.

FIGS. 2-A and 2-B are perspective views of a cup-shaped container and a tray-shaped container of this invention.

DETAILED DESCRIPTION OF PREFERRED EMBODIMENTS

Figures 3, 4:
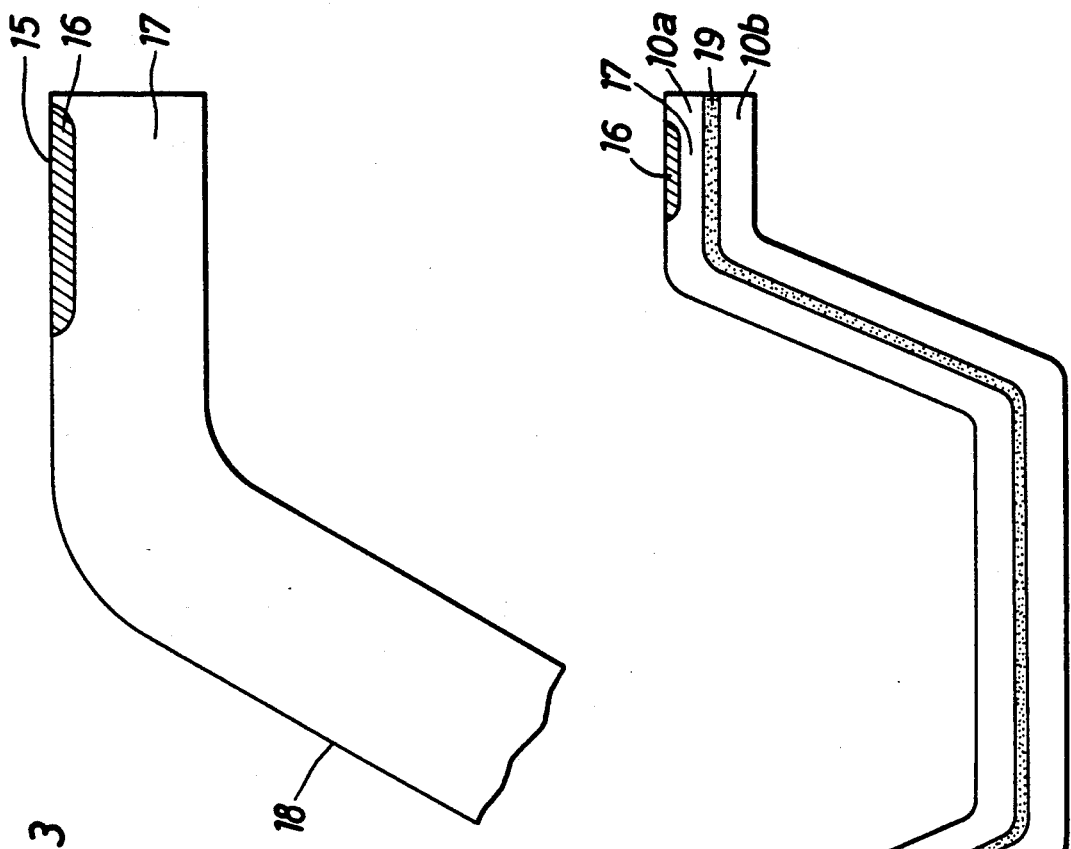
FIG. 3 is a sectional view on an enlarged scale of a heat-sealing flange.
FIG. 4 is a sectional view showing one example of a multilayer container.

The closure of this invention comprises a laminate having a heat-sealable layer composed of as a main component a copolymerized polyester having a softening temperature of at least 120° C. and a glass transition temperature of 30° to 85° C., a metal substrate, and an epoxy-phenol resin primer layer interposed between them. In this invention, the copolymerized polyester is used as a heat-sealable layer because it shows excellent heat sealability with respect to at least the heat seal portion of the container. As stated above, a heat sealing operation of polyesters to each other, for example, to PET surface to each other, is extremely difficult because of the high melting point and the crystallization at the time of heat sealing. In the present invention, as a result of forming the heat-sealable layer from the copolymerized polyester, even when the PET in the heat-sealable portion of the container is already crystallized, a heat-sealed portion having a high peel strength can be formed. If the softening temperature (ring-and-ball method) is less than 120° C., the resulting heat-sealed portion becomes thermally weak. At the time of retorting, the heat-sealed portion will break owing to creep or leaks or latent leaks will occur. It is important that the copolymerized polyester should have a glass transition temperature (Tg) of 30° to 80° C., especially 40° to 70° C. If its Tg is lower than the above specified lower limit, the mechanical strength or blocking property of the heat seal layer and the heat-bondability with respect to PET will become inferior. If the Tg is higher beyond the above range, the adhesion with the primer described below becomes inferior, and its heat-bondability with respect to PET becomes inferior.

In the closure of this invention, a metal substrate is used from the standpoint of the mechanical strength and gas barrier property of the closure itself. It is also an important characteristic that an epoxy phenol resin primer layer is provided between the metal substrate and the copolymerized polyester heat-sealable layer. The epoxy-phenol resin primer layer shows strong adhesion to both of the metal substrate and the copolymerized polyester layer, and even under hot water treating conditions, the delamination between both layers is prevented. The epoxy-phenol resin itself is a thermosetting resin having excellent thermal resistance and hot water resistance, and brings about the unexpected action that the copolymerized polyester layer itself is fixed, and the copolymerized polyester layer is rendered thermally strong.

According to this invention, by using a laminate having a heat-sealable layer comprising as a main component a copolymerized polyester resin having a softening temperature of at least 120° C. and a glass transition temperature of 30° to 85° C., a metal substrate and an epoxy phenol resin primer layer interposed between these layers for heat sealing of a thermoplastic polyester container, a tight and firm sealed structure can be formed irrespective of the state of the polyester. This sealed structure by heat sealing has excellent thermal resistance, hot water resistance, delamination strength and pressure strength. Furthermore, the heat sealing operation can be performed within a shorter period of time than in the prior art. Now, the heat-sealable closure of this invention will be described in detail with reference to the accompanying drawings.

In FIG. 1 which shows one example of the sectional structure of the heat-sealable closure. Inwardly of a metal substrate 1 is provided a heat-sealable layer 3 of a copolymerized polyester via an epoxy-phenol resin primer layer 2. Outwardly of the metal substrate 1, a printed layer or an over-coated layer 4 may be provided. In FIG. 2 showing another example of the closure, a plastic film 5 having a printed layer 4' may be bonded to the outside of the metal substrate 1 via an adhesive primer layer 6.

As the metal substrate 1, any metal foil such as an aluminum foil, a steel foil, a tin plate foil, an electrolyic chromate-treated foil, a phosphate and/or chromate chemically treated steel foil may be used. The thickness of these metal foils may be generally 1 to 200 μm, especially 5 to 150 μm. When an aluminum foil is to be used, it is desirably surface-treated, for example phosphate and/or chromate treated, organic zirconium treated or organic titanium treated. A preferably used epoxy-phenol resin primer is one containing an epoxy resin and a phenol resin in a weight ratio of from 35:65 to 95:5, and especially from 50:50 to 90:10. Resol-type phenolaldehyde resins obtained by condensing phenols with formaldehyde in the presence of basic catalysts may be used as the phenolic resin. The phenols may include, for example, trifunctional phenols typified by phenol, difunctional phenols typified by cresol, and polynuclear phenols typified by bisphenol A, either singly or in combination. Phenolic resins which are particularly preferred for the purpose of this invention have a functionality index (F.I.), defined by the following formula, of 1.5 to 2.8, especially 1.6 to 2.8.

$$F.I. = 2M_2 + 3M_3 + 4M_4$$

wherein $M_2$ is the mole number of a difunctional monohydric phenol per 100 g of entire phenol components contained in the phenolaldehyde resin, $M_3$ is the mole number of a trifunctional monohydric phenol per 100 g of entire phenols, and $M_4$ is the mole number of a polynuclear divalent phenol per 100 g of entire phenol components.

The number of methylol groups per phenol on an average is 0.05 to 0.40, especially 0.7 to 0.30, the number average moleculare weight of the phenolic resin is desirably 200 to 800 in general, and 230 to 600 in particular.

Epoxy resins obtained by the condensation of bisphenol A and epihydrin and having an epoxy equivalent of 600 to 6000, especially 900 to 4000, may be preferably used.

There is no particular limitation on the thickness of the primer coating if the aforesaid objects are achieved. Generally, it desirably has a thickness of 0.2 to 30 μm, especially 1 to 20 μm.

The copolymerized polyester has the aforesaid softening temperature and Tg. Preferred copolymerized polyesters are composed of 20 to 95 moles of an acid component, particularly 30 to 80 mole % of a terephthalic component, and the remainder being an aromatic dicarboxylic acid component other than terephthalic acid or an aliphatic or alicyclic dicarboxylic acid component, and 20 to 95 mole % of a diol component, especially 30 to 80 mole % of ethylene glycol (EG) component and the remainder being a diol component other than EG. Examples of the acid component used for copolymerization may be isophthalic acid, naphthalenedicarboxylic acid, maleic acid, fumaric acid, succinic acid, adipic acid, sebacic acid and cyclohexanedicarboxylic acid. Examples of the glycol component may be propylene glycol, diethylene glycol, butanediol, neopentyl glycol, cyclohexanedimethanol, hexylene glycol, triethylene glycol, and polyhydric alcohols such as glycerol, mannitol, pentaerythritol and sorbitol. Desirably, the copolymerized polyester used has an intrinsic viscosity (I.V.), measured at a temperature of 20° C. in a concentration of 0.2 g/dl in phenol/1,1,2,2-tetrachloroethane (6:4 by weight), of 0.4 to 1.2, especially 0.5 to 0.9. Instead of using the copolymerized polyester singly, it may be used as a blend with an olefin resin. Furthermore, an inorganic filler, and a pigment, etc. may be incorporated.

To produce the closure of this invention, the epoxy phenol resin paint is coated on the metal substrate and dried or half-cured. Then, the copolymerized polyester is applied in the form of a solution, a film, a melt or a powder, and preferably, the copolymerized polyester is melted and simultaneously the primer is cured. This makes it possible to bond the copolymerized polyester firmly to the metal substrate. The heat-sealable layer composed of the copolymerized polyester may be provided in a thickness of generally 0.1 to 30 μm, especially 1 to 15 μm.

The container on which to form the heat-sealable layer may be a container at least the heat-sealable portion of which is formed of a resin composed mainly of a polyester. Examples are a container of PET, a container of a copolyester having PET as a main component, a container of a singly layer of a blend of PET or a copolyester having PET as a main component with a polycarbonate, PBT or liquid crystalline copolyester, and containers of multilayer laminates of these resin layers having PET as a main component and other resins such as ethylene vinyl alcohol copolymer, polyamides, gas-barrier polyesters or metal foils. To impart low-temperature heat sealability and thermal resistance to the container, its inside layer which is a heat-sealable portion desirably has outstanding characteristics to be described.

First, the inside layer of the container should have a fusion temperature in the crystalline state (determined as the crystalline fusion peak temperature ... $M_p$ by a differential scanning calorimeter, DSC) of at least 200° C., particularly 200° to 400° C. It is because of the standpoint of thermal resistance of the inside layer of the container that the crystalline fusion melting temperature of the resin of the inside layer is defined within the above range. The container of this invention is heat-sterilized (e.g., retorted) while holding an article, or is cooked in an electronic oven or in an oven toaster while holding an article. It should have a crystalline fusion temperature within the above range to prevent its thermal deformation, strength reduction and the tendency of extracting or dissolving the contents during such heatings.

Next, the thermoplastic resin constituting at least the inside layer should be crystalline, and the inside layer actually should be oriented and crystallized or heat-crystallized. The orientation and crystallization and heat-crystallization are the same because both are crystallization. In the case of the former, the crystallization has anisotropy three-dimensionally, whereas the latter differs from the former in that the crystallization is isotropic three-dimensionally as in the case of spherulite. Since the resin in at least the inside layer in the heat-seal container of this invention is crystallized highly, it assumes a thermally stable structure with enhanced thermal resistance and its properties required of a container, such as rigidity, creep resistance, gas-barrier property and extraction resistance, are improved. The degree of crystallization of a thermoplastic resin, i.e., the crystallinity, can be determined generally by a density method (density by a density-gradient tube method), in accordance with the following equation.

$$X_{cv} = \frac{\rho - \rho_a}{\rho_c - \rho_a} \times 100 \tag{1}$$

wherein $\rho$ is the density (g/cm$^3$) of a measuring resin sample, $\rho_a$ is the density (g/cm$^3$) of a completely amorphous resin, $\rho_c$ is the density (g/cm$^3$s) of a completely crystalline resin, and $X_{cv}$ is the crystallinity (%) of the measuring resin sample.

For example in the PET, it is the general practice to use the following values.

$\rho_a = 1.335$ (g/cm$^3$)
$\rho_c = 1.455$ (g/cm$^3$)

In the container of this invention, if the crystallinity ($X_{cv}$) of the inside layer is at least 20%, satisfactory results are obtained with regard to the above properties.

A third and marked characteristic of the container of this invention is that in the heat-sealable portion of the inside layer, a substantially amorphous or low crystalline resin portion is provided in a minute thickness ranging halfways to the thickness direction of the inside layer from the heat-sealing surface. By providing a substantially amorphous or low crystalline resin portion in the heat-seal portion, heat sealing can be carried out at a temperature lower than the melting point ($M_p$) of the resin, generally at a temperature of from $M_p-100°$ C. to $M_p-10°$ C. Not only low-temperature sealing can be carried out, but also a heat seal portion having a high seal strength of at least 1.5 kg/15 mm with can be formed. At the same time, this heat-seal portion can fully withstand retorting at 120° C. for 30 minutes, for example. It is important that the substantially amorphous or a low crystalline resin portion should be provided in a minute thickness ranging from the heat sealing surface to halfways in the thickness direction of the inside layer. If the amorphous or low crystalline portion extends extends in the thickness direction, the heat sealing portion is thermally deformed and the sealing strength and the thermal resistance of the heat-sealed portion are markedly degraded. According to this invention, however, by providing the amorphous or low crystalline portion only in a part in the thickness direction in proximity to the heat sealing surface of the heat seal portion and leaving the oriented and crystallized portion or the heat-crystallized portion in the other parts in the thickness direction, low-temperature sealability and easy sealability can be obtained without the aforesaid defects.

Since the amorphous or low crystalline resin portion exists in a minute thickness, the crystallinity of this portion is difficult to measure by the density method (density-gradient tube method). By utilizing a characteristic absorption band dependent upon the crystallinity of the resin, the density distribution of the resin is measured by the Laser Raman method, and the crystallinity is calculated from this density on the basis of equation (1) given above. This characteristic absorption band is a peak at a wave number of 1730 cm$^{-1}$ based on the stretching vibration of

and the density ($\rho$) can be determined on the basis of the following equation $$\rho = \frac{\Delta v_{1/2} - k_1}{k_2} \quad (2)$$

wherein $\Delta v_{\frac{1}{2}}$ is the half width (cm$^-$) of the above characteristic absorption peak, and $k_1$ and $k_2$ are the intercept and the gradient determined from a calibration curve in which the axis of ordinates represents the half width regarding this resin and the axis of abscissas represents the density.

The amorphous or low crystalline portion desirably has a crystallinity ($X_{cv}$) of not more than 20%.

The inside layer in this invention is such that the entire structure containing the inside layer (single layer) may be composed of a resin having the above melting temperature and the crystallized structure, or only the inside layer in the laminated structure may be composed of the above resin.

This will be described below in detail.

In FIGS. 2-A and 2-B showing one example of the heat-sealed container of the invention, the container body 8 is of a cup shape (FIG. 2-A) or a tray shape (FIG. 2-B), and has a short barrel portion 9, a closed bottom portion 13 connected to the lower end of the barrel portion and a heat-sealing flange portion 14 connected to the upper end of the barrel portion. There is a heat-sealable closure 12 separate from a container body 1, and sealing by heat sealing is performed between the heat-sealable closure 12 and the container flange portion 14.

In this specific embodiment, the seal body 8 is composed entirely of an oriented and crystallized or heat-crystallized resin having a crystal fusion temperature ($M_p$) of at least 200° C. In FIG. 9 which shows the heat-sealing flange 14 of the container body 8 on an enlarged scale, the flange portion 14 has a heat seal surface 15, a substantially amorphous or low crystalline resin portion 16 with a minute thickness d is formed from the heat seal surface 15 to halfways in the thickness direction of the flange portion 14. Beneath it is present an oriented and crystallized or heat-crystallized resin portion 17. It should be understood that the substantially amorphous or low crystalline resin portion 16 exists only in that portion which is to be heat-sealed (part or the whole of the flange portion), and the other portion of the resin container 1, such as the inside surface 18 of the oriented container 8, is composed of an oriented and crystallized or heat-crystallized resin.

The containers in FIGS. 2 and 3 are examples of containers composed only of a single layer of the resin. These containers may be composed of a multilayers structure. In FIG. 4 showing an example of the multilayer container, the multilayer container 8 is composed of a gas-barrier intermediate layer 19 and inside and outside layer resin layers 10$a$ and 10$b$. At least the inside layer 10$a$, preferably both resin layers 10$a$ and 10$b$, are formed of the resin layers which satisfy the requirements of the present invention. In its heat-sealed portion, the same heat-sealed portions 16 and 17 as in FIG. 3 are formed. A metal foil or a gas-barrier resin to be described are used as the gas-barrier intermediate layer 19.

Figure 5:
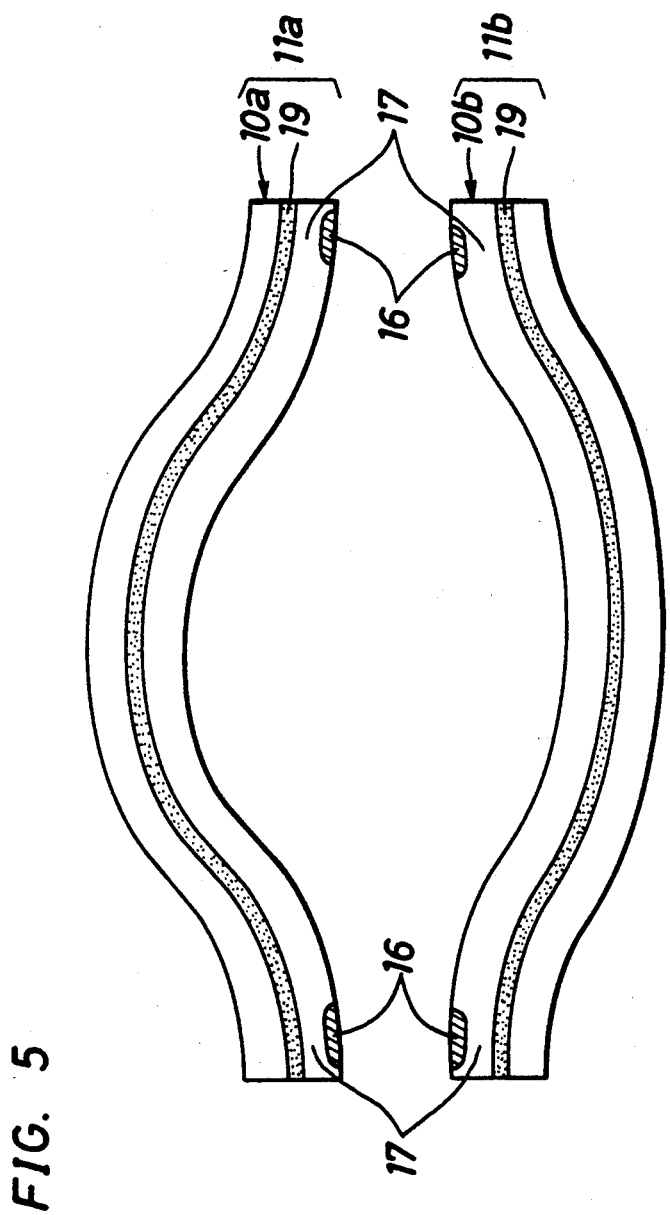
FIG. 5 is a sectional view showing another example of the multilayer container.

In FIG. 5 showing another example of the container, this container is of such a structure that two opposing pieces of sheet-like packaging materials 11$a$ and 11$b$ are formed in a bag shape, and around them the packing materials are heat-sealed. The sheets 11$a$ and 11$b$ are composed of the resinous inside and outsides layers 10$a$ and 10$b$ and gas-barrier intermediate layers are sandwiched between them. In those parts of these sheets 11$a$ and 11$b$ which are to be heat-sealed the same heat-sealed structures 16 and 17 as described in FIG. 3 are formed.

It should be understood of course that in this invention a heat-sealed closure 12 (FIG. 2) may have the laminated structure and the structure of the heat-seal portion shown in FIG. 1.

Examples of the resin which has a fusion melting temperature ($M_p$) is at least 200° C. and which can be crystallized are aromatic thermoplastic polyesters derived from dibasic aromatic carboxylic acids and diols such as polyethylene terephthalate (PET), polybutylene terephthalate (PBT) and polyethylene naphthalate (PEN). These polyesters may contain dibasic acids such as isophthalic acid, adipic acid, decanecarboxylic acid or succinic acid, or diols such as diethylene glycol, triethylene glycol, propylene glycol or neopentanediol. These copolymer components may preferably be contained in amounts of not more than 20 mole % based on the acid or diol component. The polyesters used preferably have an intrinsic viscosity [$\eta$] of generally 0.4 to 1.8 dl/g, especially 0.5 to 1.5 dl/g. For the purpose of this invention, polyethylene terephthalate is especially preferred.

The resin used as a heat-sealing portion of the inside layer is not limited to polyesters satisfying the aforesaid requirements. It may include, for example, aliphatic nylon such as nylon 6, nylon 6,6, nylon 6,8 and nylon 4,6; polyamides derived from aromatic dibasic acids and aliphatic diamines, such as polyhexamethylene terephthalamide, polyhexamethylene terephthalamide/isophthalamide, polyoctamethyleneterephthalamide and polybutyleneterephthalamide; and polyamides derived from aliphatic dibasic acids and aromatic aliphatic diamines, such as polyxylyleneadipamide and polyxylylenesebacamide. Desirably, these nylons have a relative viscosity [$\eta_{rel}$], measured in 98% sulfuric acid in a concentration of 1.0 g/dl at a temperature of 20° C., of 1.6 to 3.5, especially 2.0 to 3.0.

Of course, these resins may be used singly or as a blend of two or more of them. For the purpose of the modification of the resins, it is a matter of course that other thermoplastic resins, thermosetting resins, nucleating agents for crystallization, coloring agents, fillers, powdery or fibrous reinforcing materials, lubricants, antiblocking agents, ultraviolet absorbers, antioxidants and heat stabilizers can be incorporated.

The above resins may be molded into a container-forming material by any known molding means such as extrusion, injection molding, compression molding, blow molding, biaxially stretch blow molding, pressure formation from a sheet or film, plug assist molding, bulging, press forming, draw molding and draw reduction molding. Orientation crystallization of the resin may be carried out by stretching the molded article at least monoaxially, preferably biaxially, in the aforesaid molding step or in a stretching step following the molding step, to molecularly orient it at least monoaxially, and if required, heat-setting the molecular orientation. The effective draw ratio is 2 to 15 times, especially on the order of 3 to 13 times, in terms of the area times. The heat-setting temperature differs depending upon the resin. But desirably, it is carried out at a temperature of at least 150° C. for polyesters, and at least 180° C. for polyamides.

The heat crystallization of the resin is carried out by keeping the container-forming material at the crystallization temperature of the resin. The crystallization temperature is inherent to the resin used. Generally, it is at least the glass transition point (Tg) of the resin, but below its melting point ($M_p$), especially suitably Tg +20° C. to $M_p$ −20° C. The crystallization rate depends upon the crystallization temperature, the presence or absence of a nucleating agent and the crystallization atmosphere. Generally, the heat-treatment is carried out suitably for 1 to 2 minutes. As the crystallization proceeds, the spherulite grows, and the resin loses transparentcy and whitening proceeds. This change tells the end point of the treatment.

The container material used in this invention may be formed of a laminate of a high-melting and high crystalline resin and another material. For example, as a metal foil or sheet used for producing this laminate, an aluminum foil, an iron foil, a steel foil, a tin plate foil, an aluminum plate foil and the same surface-treated steel sheets as the foils may be cited. The lamination of the metal foil or sheet and the above resin may be carried out by extrusion coat method, a dry lamination method or a sandwich lamination method by interposing an adhesive between them as required or by utilizing the thermoadhesiveness of the resin.

Examples of the other material include high gas-barrier resins such as an ethylene/vinyl alcohol copolymer, a vinylidene chloride copolymer, a high-nitrile resin, high barrier polyester and high-barrier nylon resin. This laminate with the high gas-barrier resin may be directly molding into a container-forming material by a co-extrusion molding method or a co-injection molding method. Or it may also be obtained the aforedescribed lamination methods.

Molding of the laminates and their orientation crystallization or heat crystallization may be carried out in the same way as in the case of a container material having a single layer structure. It should be understood that according to this invention, the orientation crystallization or heat crystallization of a high-melting and high crystalline resin may be carried out at any desired stage, for example, before lamination, before lamination and molding, during molding or after molding.

Examples of the container material include a seamless drawn or drawn and reduced metallic can whose inside surface is coated, a plastic can, a cup-shaped container, a tray-like container, a bottle-like container, a tank-like container, and a flexible pouch and a heat sealed closure. One or both of the container materials may have a heat-sealed portion having the structure specified in this invention.

In the present invention, the amorphous or low crystalline resin portion present in the heat sealable portion may preferably have a thickness 1 to 30%, especially 3 to 20%, most preferably 5 to 10% of the thickness of the oriented and crystallized or heat crystallized resin layer near this portion existing near this portion. If the thickness of the amorphous or low crystalline portion is less than that in the above range, the low temperature heat-sealability or easily sealability tends to be difficult to obtain. If the above range is exceeded, the thermal stability of the heat seal portion tends to be lowered. Desirably, the thickness of the aforesaid portion is at least 1 $\mu$m, especially at least 2 $\mu$m.

The width of the substantially amorphous or low crystalline resin portion provided in the heat-sealable portion may be varied as desired, but preferably 1 to 10 mm, especially 2 to 6 mm. According to this invention, the characteristic feature is that even when the heat seal width is as small as described above, a heat seal having a seal strength of 1.5 kg/15 mm width and excellent sealing reliability can be obtained. By limiting the width of the heat seal portion to 5 mm or less, an easily openable heat seal can also be formed. Of course, only one amorphous or low crystalline resin portion may be provided in all parts to be heat-sealed. Alternately, a plurality of such resin portions maybe provided at small intervals.

The amorphous or low crystalline resin portion in parts to be heat-sealed in the inside layer may be provided by causing an oriented and crystallized or heat-crystallized resin in its very limited part ranging from its surface to halfways in it thickness direction to be rapidly heated to a temperature above the melting point within a short period and to be rapidly cooled to a temperature lower than the crystallization temperature upon the stopping of heating.

For such laminated rapid heating and rapid cooling, scanning and irradiation of a carbon dioxide gas laser may, for example, be used. In this case, by varying the output and scanning speed of the laser beam, the thickness of the amorphous or low crystalline resin portion may be controlled. Furthermore, its width may be controlled by varying the diameter of the laser beam. For a further limited rapid heating and rapid cooling, a combination of a forcibly cooled high frequency induction heating coil and a conductor former having a heat sealing pattern may also be used. In this case, by the conduction to the coil, the former is rapidly heated, and the resin contacting it is rapidly heated, and by shutting off electrical conduction, the resin is rapidly cooled through the former. Thus, by controlling the conduction time, the thickness can be controlled.

In the heat-sealable container of this invention, heat sealing may be carried out by using a known heat sealing mechanism such as a hot plate, an impulse seal, an induction heating seal, an ultrasonication seal, or a high-frequency induction heating seal. In any case, it is the marked characteristic that the heat seal can be carried out at temperatures lower than the melting point ($M_p$) of the high-melting highly crystallized resin.

According to this invention, by forming the inside surface layer of the container from an oriented and crystallized or heat-crystallized resin having a crystal fusion temperature of at least 200° C. and causing the heat-sealable portion of the inside surface layer to have a substantially amorphous or low crystalline thermoplastic polyester portion ranging from the heat seal surface to halfways in the thickness direction of the insides surface layer in a minute thickness, there can be provided a heat-sealable container having a combination of low-temperature heat-sealability and heat resistance. In this container, a seal portion having a stable high strength can be formed by low-temperature heat sealing within a short period of time. This seal portion can withstand high temperature sterilization such as retorting. Furthermore, since the container itself has excellent heat resistance, when the contacts of the container are retorted or cooked in an electronic oven or an oven toaster, the extraction of the inner layer material into the contents can advantageously inhibited markedly.

Below are given examples of heat-sealed closures and containers having low heat-sealing property and excellent heat resistance.

EXAMPLE 1 AND COMPARATIVE EXAMPLES 1 AND 2

A copolymerized polyester resin composed of terephthalic acid, isophthalic acid, sebacic acid and maleic acid as an acid component and ethylene glycol, neopentyl glycol and propylene glycol as a glycol component was dissolved in a mixed solvent of toluene and methyl ethyl ketone in a weight ratio of 1:1 in a separable flask so that its concentration in the solvent was about 30% with stirring at about 70° C. to prepare a copolymerized polyester solution. The copolymerized polyester resin has a glass transition (Tg) of 52° C. as measured by a differential scanning calorimeter (DSC) at a temperature elevating speed of 20° C./min.

The copolymerized polyester resin was dissolved in a mixed solvent of phenol and 1,1,2,2-tetrachloroethane (in a weight ratio of 1:1) in a concentration of 0.2 g/ml to measure its intrinsic viscosity (I.V.). By using an Ubbelohde's automatic viscometer, the flow down time of each of the sample solution, and the solvent was measured at a temperature of 20° C.

The flow down times were substituted for the following equation, and the intrinsic viscosity (I.V.) was calculated.

$$I.V. = 1.451 \, t/t_0 - 1.369$$

t: the flow down time of the sample solution
$t_0$: the flow down time of the mixed solvent The above equation is the empirical formula for calculating the intrinsic viscosity from the flow down time of the phenol/1,1,2,2-tetrachloroethane (1:1, by weight) mixed solvent when phenol/1,1,2,2-tetrachloroethane (6:4, by weight) was used.

The intrinsic viscosity (I.V.) calculated by this method was 0.73.

Then, on the bright surface of a mild aluminum foil having a thickness of 50 micrometers was coated with an epoxy-urea-type paint as an overcoat material, and baked at 230° C. for 60 seconds. The mat surface of the aluminum foil was surface-treated with an acrylic zirconium. Then, an epoxy-phenol paint (specific gravity $d_1 - 1.20$ g/cm$^2$, solids contents 30%) containing 80:20 by weight of bisphenol A-type epoxy resin and a resol-type phenol formaldehyde composed of a binuclear component was coated by a gravure coater at a coated rate of 40 mg/cm$^2$ and the coated surface was dried at 120° C. for 60 seconds to make it tack-free. On the coated surface the copolymerized polyester solution was coated so that the amount of coating was about 90 mg/dm$^2$ and cure it, and further baked at 230° C. for 60 seconds to remove the solvent in the copolymerized polyester solution.

From the coated blank, a round closure material with a diameter of 85 mm having an opening tab. On the other hand, a blank having a size of 210×210 mm was cut from a polyethylene terephthalate sheet (density 1.34 g/cm$^3$, crystallinity 3.3%, intrinsic viscosity 0.61, thickness 0.7 mm). By a thermoforming method, a round containers having a full capacity of 85 cc with an outside diameter of 80 mm, an inside diameter of 66 mm, a flange width of 7 mm and a height of 35 mm was made from the blank. At this time, the density and crystallinity of the flange portion measured by the density gradient method were 1.380 cm$^3$ and 37.2%. The fusion temperature, measured by a differential scanning calorimeter (DSC) at a temperature elevating speed of 20° C./min, was 255° C.

Then, cream corn soup was filled in an amount of 70 cc at a filling temperature of 65° C. in 120 round containers. The closure material was applied to the filled containers with a heat sealing time of 1 and 2 seconds to prepare sixty samples respectively. The distance from the flange surface to the liquid surface of soup was about 5 mm. Thirty samples taken from these sealed containers (total sixty samples) were retorted at 120° C. for 30 minutes. The changes in adhesion strength before and after the retorting were determined. The measuring method was as follows: A rectangular sheet having a width of 15 mm was taken at right angles to the sealed portion at a rate of 4 from each (total 120 samples). The closure material side of the rectangular sheet was held on the upper chuck, and the side wall of the cup, on the lower chuck. The rectangular sheet was thus pulled up and down at a rate of 300 mm/min. The heat seal strengths of the samples were measured, and averaged. The adhesion strengths at this time were as shown in Table 1. The peeling surface was between the PET substrate and the copolymerized polyester.

As Comparative Example 1, a sample was prepared by directly coating the above solution of copolymerized polyester by a gravure coater at a rate of 90 mg/dm² on the aluminum foil surface-coated without coating the epoxy phenol paint and drying the coating layer at 230° C. for 60 seconds. As Comparative Example 2, a vinyl paint was coated on a surface-treated aluminum foil was coated as a primer and dried. Then, on the coated surface, a copolymerized polyester was applied and based at 180° C. for 2 minutes. These coated materials were also subjected to a heat seal test and their adhesion strengths were measured before and after retorting. The results are shown in Table 1. In Comparative Example 1, the interfacial peeling was between the aluminum foil and the copolymerized polyester. In Comparative Example 2, cohesive failure of the vinyl paint used as the primer occurred. In both case, no sufficient adhesion strength was obtained.

TABLE 1

| | Heat sealing time (sec) | Retorting | Heat seal strength (kg/15 mm) | Peeling surface |
|---|---|---|---|---|
| Example 1 | 1 | no | 2.33 | PET/CoPEs |
| | | yes | 2.28 | PET/CoPEs |
| | 2 | no | 2.44 | PET/CoPEs |
| | | yes | 2.58 | PET/CoPEs |
| Comparative Example 1 | 1 | no | 0.40 | CoPEs/Al |
| | | yes | 0.31 | CoPEs/Al |
| | 2 | no | 0.54 | CoPEs/Al |
| | | yes | 0.40 | CoPEs/Al |
| Comparative Example 2 | 1 | no | 1.30 | Cohesive failure at the primer |
| | | yes | 0.50 | Cohesive failure at the primer |
| | 2 | no | 1.51 | Cohesive failure at the primer |
| | | yes | 0.52 | Cohesive failure at the primer |

Retorting: 120° C. - 30 minutes
PET: The flange portion of the container was composed of polyethylene terephthalate
CoPEs: Copolymerized polyester
Al: aluminum foil

EXAMPLES 2-5 AND COMPARATIVE EXAMPLES 3 AND 4

By varying the composition of monomers constituting copolymerized polyester resins used as a material for coating the inside surface of a closure, various copolymerized polyester resins having various glass transition temperature (Tg) were prepared. In the same way as in Example 1, a closure material was prepared, and the same heat sealing test and the same retorting treatment as in Example 1 were carried out. The changes in adhesion strength before and after the retorting treatment were examined, and the peeled surfaces were examined. The results are shown in Table 2.

When Table 2 is reviewed, in Comparative Example 3 in which Tg was lower than 30° C., the peeled surface was interfacial peeling between the PET substrate and the copolymerized polyester, but no sufficient adhesion strength was obtained. When Tg exceeded about 70° C., the peeled surface was interfacial peeling between the PET substrate and the copolymerized polyester, and tended to shift to a mixture of it with the interfacial peeling between the copolymerized polyester and the epoxy-phenol paint as a primer. In other words, the adhesion to the primer was considered to be inferior. Furthermore, the hot adhesion to PET also tended to be lowered.

As Comparative Example 4, the bright surface of an aluminum foil was coated with an epoxy-urea paint as an overcoat material and then baked at 230° C. for 60 seconds. Then, the mat surface of the aluminum foil was surface-treated, and the epoxy-phenol paint as used in Example 1 was coated and dried. On the resulting coating layer a blend resin comprising terephthalic acid, naphthalenedicarboxylic acid and ethylene glycol was coated by extrusion, and then baked to prepare a closure material. At this time, the glass transition temperature of the resin was 90° C. The product was subjected to a heat sealing test by the same method as shown in Example 1, and then the adhesion strength was measured. From the results, before and after the retorting, the adhesion strength were considerably lower than the adhesion strength obtained in Examples 2 to 5

TABLE 2

| | Glass transition temperature (°C.) | Heat sealing time (sec) | Retorting | Heat seal strength (kg/15 mm) | Peeling surface |
|---|---|---|---|---|---|
| Comp. Example 3 | 24 | 1 | no | 1.25 | PET/CoPEs |
| | | | yes | 1.22 | PET/CoPEs |
| | | 2 | no | 1.61 | PET/CoPEs |
| | | | yes | 1.41 | PET/CoPEs |
| Example 2 | 30 | 1 | no | 1.72 | PET/CoPEs |
| | | | yes | 1.54 | PET/CoPEs |
| | | 2 | no | 2.11 | PET/CoPEs |
| | | | yes | 1.80 | PET/CoPEs |
| Example 3 | 50 | 1 | no | 2.19 | PET/CoPEs |
| | | | yes | 1.67 | PET/CoPEs |
| | | 2 | no | 2.19 | PET/CoPEs |
| | | | yes | 1.87 | PET/CoPEs |
| Example 4 | 52 | 1 | no | 2.33 | PET/CoPEs |
| | | | yes | 2.28 | PET/CoPEs |
| | | 2 | no | 2.44 | PET/CoPEs |
| | | | yes | 2.58 | PET/CoPEs |
| Example 5 | 72 | 1 | no | 1.85 | PET/CoPEs + CoPEs/E.P. |
| | | | yes | 1.81 | PET/CoPEs + CoPEs/E.P. |
| | | 2 | no | 1.87 | PET/CoPEs + CoPEs/E.P. |
| | | | yes | 1.84 | PET/CoPEs + CoPEs/E.P. |
| Comp. Example 4 | 90 | 1 | no | 0.98 | PET/blend resin |
| | | | yes | 0.50 | PET/blend resin |
| | | 2 | no | 1.00 | PET/blend resin |
| | | | yes | 0.51 | PET/blend resin |

Retorting: 120° C. - 30 minutes
PET: The flange portion of the container was composed of polyethylene terephthalate
CoPEs: Copolymerized polyester
E.P.: Epoxy-phenol paint

EXAMPLES 6 AND 7

Copolymerized resins having varied intrinsic viscosity (I.V.) were prepared by varying the degree of polymerization of the copolymerized polyester resins for use in coating the inside surface of a closure material. By the same method as shown in Example 1, closure materials were prepared, the same heat sealing test and retorting as in Example 1 were carried out. Changes in adhesion strength before and after the retorting and the peeled surfaces were examined, and the results are shown in Table 3.

The method of calculating the I.V. values were as stated hereinabove.

In Example 6 and 7, the adhesion strengths before and after the retorting were sufficiently high, and it is seen that the use of copolyester resins having intrinsic viscosity ranges mentioned above give good adhesion strength.

TABLE 3

| | Intrinsic viscosity (I.V.) | Heat sealing time (sec) | Retorting | Heat seal strength (kg/15 mm) | Peeling surface |
|---|---|---|---|---|---|
| Example 6 | 0.66 | 1 | no | 2.08 | PET/CoPEs |
| | | | yes | 2.05 | PET/CoPEs |
| | | 2 | no | 2.40 | PET/CoPEs |
| | | | yes | 2.34 | PET/CoPEs |
| Example 7 | 0.73 | 1 | no | 2.33 | PET/CoPEs |
| | | | yes | 2.28 | PET/CoPEs |
| | | 2 | no | 2.44 | PET/CoPEs |
| | | | yes | 2.58 | PET/CoPEs |

Retorting: 120° C. - 30 minutes
PET: The flange portion of the container was composed of polyethylene terephthalate
CoPEs: Copolymerized polyester
E.P.: Epoxy-phenol paint

EXAMPLE 8 AND COMPARATIVE EXAMPLES 5 TO 7

By the same method as in Example 1, a round container was produced from as polyethylene terephthalate sheet by a thermoforming method. The density and crystallinity of the flange portion, measured by the density gradient tube method, were 1,380 cm³ and 37.2%. The fusion temperature was 255° C. as measured by a differential scanning calorimeter (DSC) at a temperature elevating speed of 20° C./min.

By using a carbon dioxide laser generator device (produced by Toshiba Co., Ltd: 1.2 kW carbon dioxide gas laser generator device; type: TOSLASERCO12-PSSB, mode: high speed axial flow type), a laser beam having a diameter of about 18 mm was converted into a defocus beam by means of a condensing lens having a focal distance of 127 mm, and a beam having a spot diameter of about 7.5 mm on an irradiating surface was obtained. The round container was rotated at a peripheral speed of 60 m/min. For a time (about 0.22 seconds) corresponding to one rotation of the container, a laser beam with an output of 250 W was irradiated onto the flange portion of the container.

A cut flange portion of the container flange portion was cut out by a microtome and observed under a polarizing microscope. That portion of the container which was not affected by the laser beam was whitened by heat crystallization, whereas the laser-irradiated portion was clear and easy to distinguish. To clarify the difference between the laser-irradiated portion and the unirradiated portion, by using a microscopic Raman spectrophotometer device, an Ar laser beam with an output of about 80 mW was reduced to a beam with a spot diameter of 1 micrometer by means of a 100× object lens, and irradiated onto the surface layer of the cross section of the irradiated portion which looked transparent under a polarizing microscope, and onto the portion which was not affected by the laser beam and was whitened by heat crystallization, and the Raman strengths of these portions were measured. By utilizing the relation that the Raman strength of the carbonyl group at 1730 cm$^{-2}$ by stretching vibration is inversely proportional to the density, the densities of both were determined from formula (2). Table 4 shows these densities (g/cm³) and the crystallinties $X_{cv}$ obtained by substituting these densities for the formula (1). It is seen that the laser-irradiated portion was low crystalline. The intercept $k_1$ and gradient $k_2$ used to determined density from the formula (2) were as follows:

$k_1 = 114.37$ $k_2 = -79.95$

Furthermore, under a polarizing microscope, the cut section of this sample was photographed. From the photograph, the ratio of the thickness of the low crystalline portion to the thickness of the flange portion resin was determined and found to be about 7%. The irradiation width was in the form of about 2 mm annular ring.

Into 100 round containers prepared by the above method, cream corn soup was filled in an amount of 70 cc at a filling temperature of 65° C. By using the closure materials used in Example 1, the filled containers were heat-sealed for a heat-sealing time of 1 second and 2 seconds respectively to form fifty samples for each heat-sealing time. The distance between the soup liquid surface to the flange surface was found to be about 5 mm. To examine the sealing properties of the 100 filled and sealed containers, 15 samples were taken up for each sealing time. A cylindrical weight having a diameter of 70 mm and a weight of 20 kg was placed for 1 minute on the sealed closure, and the presence or absence of leakage of the contents was examined (a compression resistance test). Among the 15 samples each (total 30 samples), none showed a leakage of the contents, and the sealability of these samples was complete. From the other 10 samples (total 20 samples), rectangular sheets having a width of 15 mm were cut out at right angles to the sealed portion from the sealed portions of the samples at a rate of 4 per sample. By the same testing method as in Example 1, the heat seal strengths of the samples from the inside of the containers were measured, and averaged. When the sealing was carried out at a temperature of 200° C. which is 60° C. lower than the melting point of PET, the heat seal strength between the container body and the closure was 2.3 kg/15 mm on an average with a heat-sealing time of 2 seconds, and the seal could be easily peeled. The remaining 50 samples were retorted at 120° C. for 30 minutes. Then, 15 samples (total 30 samples) were subjected to the compression resistance test, and on the remaining 10 samples (total 20 samples), the heat seal strength between the container body and the closure was measured by the same method. The heat seal strength was 1.9 kg/15 mm on an average with a heat sealing time of 2 seconds. When the closure was opened at the tab of the opening portion, peeling could be easily performed.

As Comparative Example 5, 100 containers in which the heat seal portion had a crystallinity ($X_{cv}$) of 37.2% and did not include a low crystalline portion as in the present invention were heat-sealed by using the same closures, and the same tests were carried out. Even before retorting, leakage of the contents was noted in most samples. The heat seal strength was as low as about 1.0 kg/15 mm when the sealing was carried out at 200° C. for 2 second. After the retorting, leakage was noted in all the samples, and no sealing properties could be secured.

As Comparative Example 6, with respect to the containers used in Comparative Example 5, a test was attempted of heat-sealing the closure material at a temperature above the melting point of PET and immediately then, applying a cooling bar kept at a surface temperature of 10° C. to the sealed portion. In this case, the deformation of the flange portion and foaming of the flange surface were vigorous at the time of heat-sealing. Sealing strengths were obtained but varied considerably. Leakage of the contents were observed in several samples. Furthermore, after the retorting, leakage was seen, and sealing properties could not be secured.

Furthermore, in Comparative Example 7, heat sealing under the same conditions as stated above were attempted on containers in which the heat seal portions were not heat-crystallized and had a crystallinity of 3.3%. Seal strength could be obtained, but at the time of sealing, the flange portion was deformed heavily, and at the time of retorting, the containers were heavy deformed. The containers lacked practical utility and heat resistance. Table 5 also shows the results of measurement of heat seal strengths in Comparative Examples 5, 6 and 7.

TABLE 4

|  | Laser-irradiated portion | Portion not irradiated with laser |
|---|---|---|
| Density $\rho$ (g/cm$^3$) | 1.351 | 1.370 |
| Crystallinity $V_{CV}$ (%) | 13.3 | 29.2 |

TABLE 5

| Run No. | Heat-sealing temperature (°C.) | Heat-sealing time (sec) | Retorting | Heat seal strength (kg/15 mm) | Number of samples from which the contents leaked (out of 15 samples) |
|---|---|---|---|---|---|
| Example 8 | 200 | 1 | no | 2.9 | 0 |
|  |  |  | yes | 1.8 | 0 |
|  |  | 2 | no | 2.3 | 0 |
|  |  |  | yes | 1.9 | 0 |
| Comp. Example 5 | 200 | 1 | no | 1.0 | 14 |
|  |  |  | yes | 0.9 | 15 |
|  |  | 2 | no | 1.1 | 14 |
|  |  |  | yes | 1.0 | 15 |
| Comp. Example 6 | 300 | 1 | no | 1.8 | 10 |
|  |  |  | yes | 1.7 | 12 |
|  |  | 2 | no | 1.9 | 13 |
|  |  |  | yes | 1.8 | 12 |
| Comp. Example 7 | 200 | 1 | no | 2.1 | 0 |
|  |  |  | yes | (note a) | 7 |
|  |  | 2 | no | 2.3 | 0 |
|  |  |  | yes | (note a) | 5 |

Retorting: 120° C. - 30 minutes
(note a): Deformation of the container was great, and the heat seal strength was difficult to measure.

EXAMPLE 9

The flange portions of the round sealed containers compound of polyethylene terephthalate used in Example 1 were modified heat conduction by induction heating of a 0.24 mm steel plate coated with Teflon by using a high-frequency oscillator (oscillating frequency 400 KHz, oscillating output 5 kW) under conditions involving an oscillating time of 0.3 s, a pressure of 5.3 kg/cm$^2$, a pressing cooling time of 0.3 s after application of pressure, and a voltage of 110 V. The density of the surface layer portion in the cross section of this modified portion was 1.352 g/cm$_3$ when measured by the laser Raman method. Its crystallinity was 14.2%. The intercept $k_1$ and the gradient $k_2$ used at this time were the same as those used in Example 8. The ratio of the thickness of the low crystalline portion to that of the flange portion resin was about 5%.

Cream corn soup was filled in 100 samples of the above round containers, and the closures used in Example 1 were heat-sealed on the containers. The heat seal strengths of the containers were evaluated by the same method as in Example 8. The heat seal strength was 2.3 kg/15 mm with a heat sealing time of 2 seconds. None of them showed a leakage of contents. After the retorting treatment, the heat seal strength between the container body and the closure was 2.1 kg/15 mm. When the closure was opened at the opening tab portion, peeling could be easily done. At that time, none of them showed leakage, either.

TABLE 6

| Run No. | Heat-sealing temperature (°C.) | Heat-sealing time (sec) | Retorting | Heat seal strength (kg/15 mm) | Number of samples from which the contents leaked (out of 15 samples) |
|---|---|---|---|---|---|
| Example 9 | 200 | 1 | no | 2.1 | 0 |
|  |  |  | yes | 1.9 | 0 |
|  |  | 2 | no | 2.3 | 0 |
|  |  |  | yes | 2.1 | 0 |

Retorting: 120° C. - 30 minutes

EXAMPLES 10, 11, 12 AND 13

As Example 10, polyethylene terephthalate (density 1.34 g/cm$^3$, crystallinity 3.3%, intrinsic viscosity 1.07) was mixed with about 3% by weight of polyethylene as a crystallization promoter, and the mixture was then formed into a sheet having a thickness of 0.55 mm. Round containers each having an outside diameter of 80 mm, an inside diameter of 66 mm, a flange width of 7 mm, a height of 35 mm and a full capacity of 85 cc were produced from the sheet by thermoforming. The density and crystallinity of the flange portion were measured by the density gradient tube method in consideration of the polyethylene content and found to be 1.371 g/cm$^3$ and 30.0%. Its fusion temperature, measured by a differential scanning calorimeter (DSC) at a temperature elevating speed of 20° C./min. was 255° C.

Cream corn soup was filled in 120 samples of the containers prepared above by the same method using the same closures as in Example 1. The containers were retorted, and their heat seal strengths were measured. The results are shown in Table 7. The peeling surface was the interfacial peeling between the PET substrate and the copolymerized polyester.

In Examples 11 and 12, the flange portions of 100 samples of these round containers were irradiated with carbon dioxide gas laser under the same conditions as in Example 8. The flange portions of another 100 samples of these round containers were modified by using a high frequency oscillator under the same conditions as in Example 9. The densities of the surface layer portions of the cross sections of these modified portions were measured by the laser Raman method, and found to be 1.350 and 1.352 g/cm$^3$. The crystallinities of these portion were 12.5 and 14.2%. The thickness ratio was measured in each case, and found to be about 5%. Cream corn soup was also filled in these containers, and they were evaluated by the same methods as in Example 8. These results are summarized in Table 7.

Finally, as Example 13, a high frequency oscillator was built in the male die portion of the flange portions of a thermoforming machine, and after the termination of forming the containers, the male die and a female die were closed, and in this state, the flange portion was modified by high frequency. By this method, containers with a modified flange portion were prepared. The density of the modified portion was 1.351 g/cm$^3$, as measured by the laser Raman method. The crystallinity of the modified portion was 13.3%. Its thickness ratio was about 6%. The results are also shown in Table 7. It is seen from the results of Examples 11 to 13 that low-temperature heat sealing becomes possible as a result of modifying the flange portion. The intercept $k_1$ and the gradient $k_2$ used were the same as those used in Example 8.

TABLE 7

| Run No. | Heat-sealing temperature (°C.) | Heat-sealing time (sec) | Retorting | Heat seal strength (kg/15 mm) | Number of samples from which the contents leaked (out of 15 samples) |
|---|---|---|---|---|---|
| Example 10 | 240 | 1 | no | 2.2 | 0 |
| | | | yes | 2.0 | 0 |
| | | 2 | no | 2.3 | 0 |
| | | | yes | 2.0 | 0 |
| Example 11 | 200 | 1 | no | 2.2 | 0 |
| | | | yes | 2.0 | 0 |
| | | 2 | no | 2.4 | 0 |
| | | | yes | 2.2 | 0 |
| Example 12 | 200 | 1 | no | 2.1 | 0 |
| | | | yes | 2.0 | 0 |
| | | 2 | no | 2.2 | 0 |
| | | | yes | 2.0 | 0 |
| Example 13 | 200 | 1 | no | 2.2 | 0 |
| | | | yes | 2.1 | 0 |
| | | 2 | no | 2.3 | 0 |
| | | | yes | 2.2 | 0 |

Retorting: 120° C. - 30 minutes

EXAMPLE 14 AND COMPARATIVE EXAMPLE 8

A biaxially stretched polyethylene terephthalate film (density 1.40 g/cm$^3$, crystallinity 54.2%, fusion temperature 255° C.) having a thickness of 25 μm was laminated through an epoxy/phenol paint to one surface of a 75 μm rolled steel foil having a chromate-treated layer on both surfaces, and the other surface was coated with an epoxy/phenol paint colored yellow and then the paint was cured in an oven at 205° C. for 10 minutes. The steel foil was then punched into a blank having a diameter of 140 mm. Round containers having an outwardly curled flange portion each having a height of 30 mm, an outside diameter of 78 mm, an inside diameter of 65 mm, a corner R of 1 mm and a full capacity of 85 cc were formed with the film on the inside surface of the containers by a draw-forming method by means of an elastic punch. The density and crystallinity of the flange portion were almost the same as those of the film before lamination.

Then, under the same conditions as in Example 8, carbon dioxide gas laser was irradiated on the flange portions of the containers. The density of the surface layer portion of the cross section of the irradiated portion was measured by the laser Raman method and found to be 1.349 g/cm$^3$. Its crystallinity was 11.7%. The intercept $k_1$ and the gradient $k_2$ used at this time were the same as those used in Example 8. The ratio of the thickness of the amorphous portion to the thickness of the flange portion was about 8%. The irradiated width formed an about 2 mm annular ring.

Cream corn soup was filled in 100 samples of the above round containers, and the closures used in Example 1 were heat-sealed on the filled containers under the conditions shown in Table 8. The heat seal strengths were measured by the same method as in Example 8. With a heat sealing time of 2 seconds, the heat-seal strength was 1.8 kg/15 mm. None of the samples showed a leakage of contents. Furthermore, the containers were retorted, and then the heat seal strength between the container body and the closure was measured and found to be 2.5 kg/15 mm. When the closure was opened at the opening tab portion, peeling could be carried out easily. At this time, none of the samples tested showed leakage.

As comparative Example 8, the heat seal strength was measured on the containers not subjected to laser irradiation. It was less than 1.0 kg/15 mm, and sealing properties during and after retorting could not be secured.

TABLE 8

| Run No. | Heat-sealing temperature (°C.) | Heat-sealing time (sec) | Retorting | Heat seal strength (kg/15 mm) | Number of samples from which the contents leaked (out of 15 samples) |
|---|---|---|---|---|---|
| Example 14 | 200 | 1 | no | 1.6 | 0 |
| | | | yes | 2.4 | 0 |
| | | 2 | no | 1.8 | 0 |
| | | | yes | 2.5 | 0 |
| Comp. Example 8 | 200 | 1 | no | 0.8 | 15 |
| | | | yes | 0.9 | 15 |
| | | 2 | no | 0.8 | 15 |
| | | | yes | 0.9 | 15 |

Retorting: 120° C. - 30 minutes

EXAMPLES 15 AND COMPARATIVE EXAMPLE 9

An epoxy/phenol paint colored yellow was coated on one surface of a 75 um rolled steel foil having a chromate surface-treated layer on both surfaces, and cured in an oven at 205° C. for 10 minutes. To the other surface of the coated steel foil was laminated through an urethane-type adhesive a 25 um biaxially stretched polyethylene terephthalate film (density 1.40 g/cm$^3$, crystallinity 54.2%, fusion temperature 255° C.), and the adhesive was cured at 50° C. for 3 days to form a laminated sheet. The laminated sheet was punched into a blank having a diameter of 140 mm. Containers having an outwardly curled flange portion each having a height of 30 mm, an outside diameter of 78 mm, an inside diameter of 65 mm, a corner R of 1 mm, and a full capacity of 85 cc were prepared with the film on the inside surface of the containers by a draw-forming method using an elastic punch. The density and crystallinity of the flange portion at this time were almost the same as those of the film before lamination.

Then, under the same conditions as in Example 8, carbon dioxide gas laser was irradiated on the flange portions of the containers. The density of the surface layer portion of the cross section of the irradiated portion was measured by the laser Raman method and found to be 1.349 g/cm$^3$. Its crystallinity was 11.7%.

The intercept $k_1$ and the gradient $k_2$ used at this time were the same as those used in Example 8. The ratio of the thickness of the amorphous portion to the thickness of the flange portion was about 8%. The irradiated width formed an about 2 mm annular ring.

Cream corn soup was filled in 100 samples of the above round containers, and the closures used in Example 1 were heat-sealed on the filled containers under the conditions shown in Table 9. The heat seal strengths were measured by the same method as in Example 8. With a heat sealing time of 2 seconds, the heat-seal strength was 1.8 kg/15 mm. None of the samples showed a leakage of contents. Furthermore, the containers were retorted, and then the heat seal strength between the container body and the closure was measured and found to be 2.4 kg/15 mm. When the closure was opened at the opening tab portion, peeling could be carried out easily. At this time, none of the samples tested showed leakage.

As Comparative Example 9, the heat seal strength was measured on the containers not subjected to laser irradiation. It was less than 1.0 kg/15 mm, and sealing properties during and after retorting could not be secured,

TABLE 9

| Run No. | Heat-sealing temperature (°C.) | Heat-sealing time (sec) | Retorting | Heat seal strength (kg/15 mm) | Number of samples from which the contents leaked (out of 15 samples) |
| --- | --- | --- | --- | --- | --- |
| Example 15 | 200 | 1 | no | 1.6 | 0 |
|  |  |  | yes | 2.3 | 0 |
|  |  | 2 | no | 1.8 | 0 |
|  |  |  | yes | 2.4 | 0 |
| Comp. Example 9 | 200 | 1 | no | 0.8 | 15 |
|  |  |  | yes | 0.9 | 15 |
|  |  | 2 | no | 0.8 | 15 |
|  |  |  | yes | 0.9 | 15 |

Retorting: 120° C. - 30 minutes

EXAMPLES 16-21 AND COMPARATIVE EXAMPLE 10

In Example 8, various samples having the varying thickness of the amorphous portions were prepared by varying the irradiating output of carbon dioxide gas laser.

A cross-section of the flange portion of the sample was cut out by a microtome, and the amorphous portion was observed under a polarizing microscope. With an output of less than 200 W as shown in Comparative Example 10, the observation of the amorphous portion was difficult, and when an attempt was made to heat-seal the same closure as used in Example 1 on the container body, the heat seal strength was very weak, and sealing property could not be secured.

If conversely the output was more than 350 W, the ratio of the thickness of the amorphous portion was more than 13% with respect to the thickness of the heat-crystallized resin layer of the flange portion, but a foaming phenomenon occurred, as shown in Examples 19 to 21. For this reason, the peel strength after heat sealing became undesirably unstable.

If under the irradiation conditions shown in Examples 16 to 18, an amorphous portion having a thickness ratio of about 5 to 10% was prepared in the flange portion of the containers, no foaming occurred in the surface layer, and the heat seal strength with respect to the closure was stable at 2.3 kg/15 mm. The containers formed had retorting resistance, and after retorting, peeling could be performed. The density $\rho$ (g/cm$^3$) of the surface layer in the cross section of the irradiated portion before retorting was measured by the laser Raman method as in Example 8. Although there was some variations, $\rho = -1.351$ cm$^3$, and the crystallinity $X_{cv} = 13.3\%$ can be seen.

TABLE 10

| Run No. | Thickness ratio of the amorphous portion (%) | Laser out put (W) | Heatseal strength (kg/15 mm) | Forming the surface layer |
| --- | --- | --- | --- | --- |
| Comp. Example 10 | — | 150 | 1.1 | no |
| Example 16 | 5.7 | 200 | 2.3 | no |
| Example 17 | 7.1 | 250 | 2.3 | no |
| Example 18 | 8.6 | 300 | 2.3 | no |
| Example 19 | 13.1 | 350 | (note b) | yes |
| Example 20 | 13.6 | 400 | (note b) | yes |
| Example 21 | 14.3 | 500 | (note b) | yes |

Thickness ratio of the amorphous portion = $\alpha/\beta \times 100$ (%)
$\alpha$: Thickness of the amorphous or low crystalline portion
$\beta$: Thickness of the oriented and crystallized or heat-crystallized resin near the $\alpha$ portion
Heat sealing conditions: 200° C., 2 seconds
(note b): Because of the unstable peel strength, the peel strength was difficult to preset

EXAMPLE 22

Biaxially stretched polyethylene terephthalate films (both density 1.40 g/cm$^3$, crystallinity 54.2%, fusion temperature 255° C.) having a thickness of 16 μm and 25 μm, respectively, were laminated to the two sides of a 20 μm aluminum foil through a urethane-type adhesive.

The portion to be sealed was the polyethylene terephthalate having a thickness of 25 μm. This portion was irradiated with carbon dioxide gas laser under the same conditions as in Example 8. The density of the surface layer of the cross section of the irradiated portion was measured by the Laser Raman method. The density was 1.349 g/cm$^3$, and the crystallinity was 11.7%. The intercept $k_1$ and the gradient $k_2$ used at this time were the same those used in Example 8. The thickness ratio of the low crystalline portion to the film thickness was about 8%.

The irradiated portion were placed opposite to each other, and three sides in the circumferential portion were heat-sealed under the conditions shown in Table 11 to prepare 100 bag-like containers (pouched) having a size of 130 mm×170 mm. Cream corn soup was filled under the same conditions as in Example 8 into these 100 pouched. The opening ends were heat-sealed under the same conditions as the conditions under which the threes sides in the circumferential portion were heat-sealed. Thereafter, 15 pouched (total 30 pouched) were subjected to the same compression-resistant test as in Example 8. None of them showed leakage. From another 10 pouched (total 20 pouches), rectangular sheets having a width of 15 mm were cut out at a rate of four per pouches (total 40). Using the sample rectangular sheets, the heat seal strengths were measured by a T peel method at a pulling speed of 300 mm/min., and averaged. The results are shown in Table 11.

The remaining 50 pouched were subjected to retorting at 120° C. for 30 minutes, and by the same methods as described above, subjected to the compression resistant test and measurement of the heat seal strength. The results are shown together in Table 11. After the retorting, no breakage of the sealed portion was observed, and the sealing property of the pouched was complete.

Attempts were made to produce pouches from a laminated sheet having no low crystalline portion. But at temperatures below the fusion temperature, the adhesion between the polyethylene terephthalate surfaces was very weak. It was difficult to prepare a pouch. Before and after the retorting, a compression-resistant test and the measurement of the heat seal strength were impossible.

TABLE 11

| Run No. | Heat-sealing temperature (°C.) | Heat-sealing time (sec) | Retorting | Heat seal strength (kg/15 mm) | Number of samples from which the contents leaked (out of 15 samples) |
|---|---|---|---|---|---|
| Example 22 | 200 | 1 | no | 3.5 | 0 |
| | | | yes | 3.0 | 0 |
| | | 2 | no | 4.0 | 0 |
| | | | yes | 3.8 | 0 |

Retorting: 120° C. - 30 minutes

What is claimed is:

1. A closure for heat-sealing a container, at least a part of a portion to be heat-sealed of which is formed of a resin containing a thermoplastic polyester as a main component, said heat-sealable closure comprising a laminate of
    (1) a heat-sealable layer containing as a main component a copolymerized polyester resin having a softening temperature of at least 120° C. and a glass transition temperature of 30° to 85° C.,
    (2) a metal substrate, and
    (3) an epoxy-phenol resin primer layer interposed between the heat-sealable layer (1) and the metal substrate (2) with the weight ratio of the epoxy resin to the phenolic resin ranging from 35:65 to 95:5,
    wherein said laminate is prepared by coating the metal substrate with said epoxy-phenol resin primer drying the coated primer layer so as to be tack-free, applying the copolymerized polyester on the surface of the coated primer layer and melting the copolymerized polyester and simultaneously curing the coated primer layer.

2. The closure of claim 1 in which the metal substrate (2) comprises an aluminum foil, a steel foil, a tin plate foil, an electrolytically chromate-treated foil, a phosphoric acid, a chromic acid or a phosphoric acid and a chromic acid chemically treated steel foil.

3. The closure of claim 1 in which the phenol component of the phenolic resin has a functionality index (F.I.) represented by the following formula of 1.6 to 2.8;

$$F.I. = 2M_2 + 3M_3 + 4M_4$$

wherein $M_2$ represents the number of moles of a difunctional monohydric phenol per 100 g of the entire phenol components contained in the phenolic resin, $M_3$ represents the number of moles of a trifunctional monohydric phenol per 100 g of the entire phenol components, and $M_4$ represents the number of a polynuclear dihydric phenol per 100 g of the entire phenol components.

4. The closure of claim 3 in which the phenol in the phenol resin is at least one phenol selected from the group consisting of trifunctional phenols, difunctional phenols and polynuclear phenols.

5. The closure of claim 1 or 2 in which the epoxy-phenol resin is a condensation product between a bisphenol and an epihydrin, and has an epoxy equivalent of 600 to 6000.

6. The closure of claim 1 wherein, 20 to 95 mole % of the acid component of the copolymerized polyester resin is terephthalic acid.

7. The closure of claim 1 in which 20 to 95%, of the diol component of the copolymerized polyester resin is ethylene glycol.

8. The closure of claim 1 in which the copolymerized polyester resin has an intrinsic viscosity, measured in a mixed solvent of phenol and 1,1,2,2-tetrachloroethane in a weight ratio of 6:4 at a concentration of 0.2 g/dl, of 0.4 to 1.2.

9. A closure for heat-sealing a container, at least a portion to be heat-sealed of which is formed of a resin containing a thermoplastic polyester as a main component, said heat-sealable closure comprising a laminate of
    (1) a heat-sealable layer containing as a main component a copolymerized polyester resin having a softening temperature of at least 120° C. and a glass transition temperature of 30° to 85° C.,
    (2) a metal substrate, and
    (3) an epoxy-phenol resin primer layer interposed between the heat-sealable layer (1) and the metal substrate (2), wherein the weight ratio of the epoxy resin to the phenolic resin ranges from 35:65 to 95:5, wherein the phenol component of the phenolic resin has a functionality index (F.I.), represented by the following formula, of from 1.6 to 2.8:

$$F.I. = 2M_2 + 3M_3 + 4M_4$$

wherein
$M_2$ represents the number of moles of a difunctional monohydric phenol per 100 g of the entire phenol components,
$M_3$ represents the number of moles of a trifunctional monohydric phenol per 100 g of the entire phenol components, and
$M_4$ represents the number of moles of a poly-nuclear dihydric phenol per 100 g of the entire phenol components, and
wherein the epoxy resin is a condensation product between a bisphenol and an epihydrin and has an epoxy equivalent of 600 to 6000, wherein said laminate is prepared by coating the metal substrate with said epoxy-phenol resin primer, drying or half-curing the coated primer layer, applying the copolymerized polyester onto the surface of the coated primer layer, and melting the copolymerized polyester and simultaneously curing the coated primer layer.

10. A process for the preparation of a closure for heat-sealing a container, at least a part of a portion to be heat-sealed of which is formed of a resin containing a thermoplastic polyester as a main component, comprising coating a metal substrate with an epoxy-phenol resin primer paint having a weight ratio of the epoxy resin to the phenolic resin of from 35:65 to 95:5, drying the coated primer layer so as to be tack-free, applying a copolymerized polyester resin having a softening temperature of at least 120° C. and a glass transition temperature of 30° to 85° C. on the surface of the coated primer layer, and melting the layer of the copolymerized polyester and simultaneously curing the primer layer.

* * * * *